April 9, 1929.  M. C. SPENCER  1,708,334

SLOW SPEED SYNCHRONOUS MOTOR

Filed Oct. 25, 1926

Inventor,
Millard Cole Spencer,
By
Attorney.

Patented Apr. 9, 1929.

1,708,334

UNITED STATES PATENT OFFICE.

MILLARD COLE SPENCER, OF EAST ORANGE, NEW JERSEY, ASSIGNOR TO CROCKER-WHEELER ELECTRIC MANUFACTURING COMPANY, OF AMPERE, NEW JERSEY, A CORPORATION OF NEW JERSEY.

SLOW-SPEED SYNCHRONOUS MOTOR.

Application filed October 25, 1926. Serial No. 143,820.

The object of this invention is to provide a synchronous motor of slow speed and simple construction, and particularly a motor suitable for driving phonograph records for which a constant speed is required to be supplied by mechanism which is noiseless and simple and does not require a governor and speed connections thereto nor the employment of reduction gearing. A further object is to provide an electric motor which is adapted for connection to the usual sixty-cycle and one hundred and ten-volt single-phase current which is customarily supplied for household use.

In the accompanying sheet of drawings which forms a part of this description,

Figure 1:
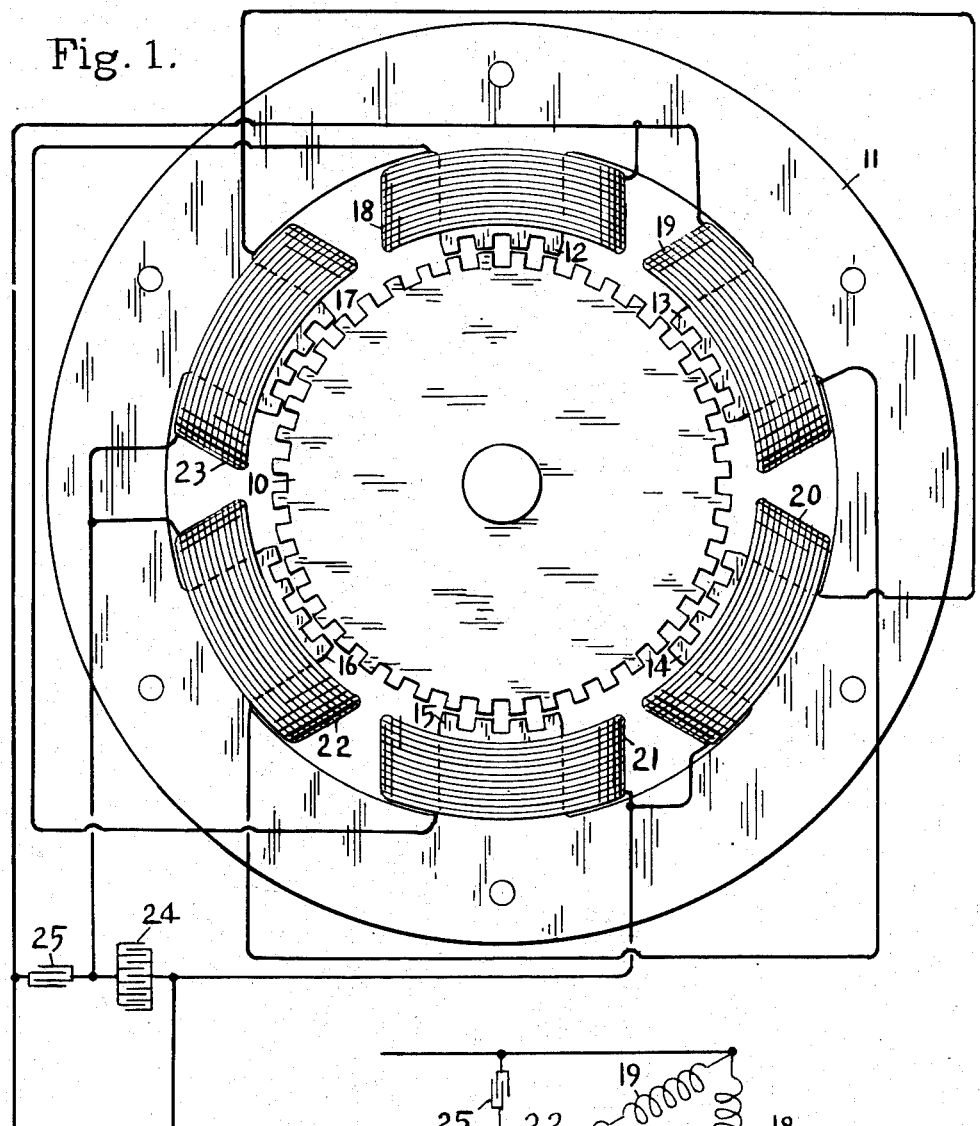
Figure 1 shows the rotor and stator elements of a motor embodying this invention together with the connections for supply from a single-phase source.
Figure 2:
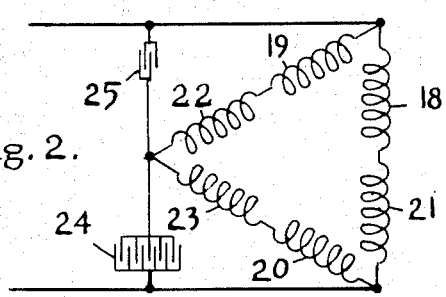
Fig. 2 shows the connections in a more familiar diagrammatic form.

A suitable motor for a phonograph drive has a laminated toothed rotor 10 with a diameter of three and one-half inches. Surrounding this is a laminated stator 11 with six inwardly projecting toothed poles 12, 13, 14, 15, 16, 17. The rotor and stator may each have a thickness of half an inch. The teeth on the several poles are preferably of the same angular spacing as the teeth on the rotor so that all on a pole may at the same instant be exactly opposite teeth on the rotor, but the teeth on different poles should be so located that as the rotor turns the rotor teeth successively come opposite the teeth of consecutive poles. Thus, as shown, the rotor teeth are opposite the teeth on pole 12, clockwise rotation of one-third the angular spacing of the teeth brings rotor teeth opposite the teeth on pole 13, and a further rotation of the same amount brings rotor teeth opposite the teeth on pole 14. The teeth on opposed poles are opposite rotor teeth at the same instant. This result is conveniently brought about by assigning a number of teeth to the rotor which is either two more or two less than a number which is divisible by six, there being six poles equally spaced and locating the teeth similarly on each of the poles. If the number of teeth in the rotor has to be other than as provided by the above rule, then the poles will need to be displaced slightly from equally spaced positions or the teeth on them specially located so that the rotor teeth will come in turn opposite the teeth of consecutive poles.

Windings 18, 19, 20, 21, 22, 23 on the poles are connected to a source of three-phase current. In the illustrated form these each have 1250 turns of No. 30 wire. The windings on opposite poles are connected to the same phase, and so that when one pole is positively magnetized the other pole will be negatively magnetized.

Ordinarily the motor will be required to operate where only single-phase current is supplied. In such cases, under the conditions given, a condenser 24 of 4.0 microfarads capacity is connected in series with a condenser 25 of 1.6 microfarads capacity across the leads, and the two additional phases are obtained by connecting around these condensers, the windings 20 and 23 being connected around the first condenser and the windings 19 and 22 being connected around the second condenser.

The particular slow speed at which the motor will run is dependent on the number of teeth in the rotor and the number of pulses which is double the number of cycles of the current which is supplied. In the case illustrated the number of teeth in the rotor should equal the number of pulses per minute divided by the required number of revolutions per minute. This with sixty cycle current, which is 7200 pulses per minute, to obtain 78 revolutions per minute, the standard speed for phonographs, is 7200 divided by 78 which is nearly 92, the required number of teeth for the rotor to bring the speed within the limits of tolerance.

I claim—

1. A slow-speed synchronous motor consisting of a toothed rotor and a plurality of toothed stator poles with teeth on each pole of substantially the same angular pitch as the teeth on the rotor, the teeth on adjacent poles being displaced with respect to the rotor teeth, means for impressing alternating magnetism on the stator poles, the magnetism on adjacent poles being in different phase whereby a number of torque pulses equal to twice the frequency times the number of phases is produced for effecting rotation.

2. A slow-speed synchronous motor consisting of a toothed rotor and a plurality of toothed stator poles with teeth on each pole of substantially the same angular pitch as the teeth on the rotor, the teeth on adjacent poles being displaced one-third of their pitch with respect to the rotor teeth, means for impressing three-phase alternating magnetism on the stator poles whereby a number of torque pulses equal to six times the frequency is produced for effecting rotation.

3. A slow-speed synchronous motor consisting of a toothed rotor and a plurality of toother stator poles with teeth on each pole of substantially the same angular pitch as the teeth on the rotor, the teeth on adjacent poles being displaced one-third of their pitch with respect to the rotor teeth, windings for the poles, a source of single-phase current, condensers in series across the single-phase leads, connections for the windings whereby three-phase current is impressed on the windings whereby a number of torque pulses equal to six times the frequency is produced for effecting rotation.

MILLARD COLE SPENCER.